/ 106-90.
02-29-72    OR    3,645,763

AU 112    EX

United States Patent
Ronzio et al.

[15] 3,645,763
[45] Feb. 29, 1972

[54] COMPOSITION FOR ELIMINATING EFFLORESCENCE IN PORTLAND CEMENT PRODUCTS

[72] Inventors: Anthony R. Ronzio; Bernard T. Pull, both of Littleton, Colo.

[73] Assignee: Bio-Organic Chemicals, Inc., Denver, Colo.

[22] Filed: Apr. 15, 1970

[21] Appl. No.: 28,951

[52] U.S. Cl. .................................................106/90, 106/314
[51] Int. Cl. ..........................................................C04b 13/24
[58] Field of Search ...................................106/90, 314, 315

[56]    References Cited
UNITED STATES PATENTS 3,030,258   4/1962   Wagner ..................................... 106/90
3,027,266   3/1962   Wikne ....................................... 106/90
2,576,955   12/1951  Ludwig ..................................... 106/90

*Primary Examiner*—Tobias E. Levow
*Assistant Examiner*—W. T. Scott
*Attorney*—Bertha L. MacGregor

[57]    ABSTRACT

A composition comprising polyvinyl alcohol characterized by high-molecular weight and viscosity and very low solubility of insoluble in water, mixed with barium hydroxide or barium oxide, and added to Portland cement in the proportion ranging from 3/4 to 5 percent of the alcohol to 100 percent of the cement, effective to prevent bleeding of salts out of the cement and thereby markedly lessen or eliminate efflorescence in Portland cement products.

7 Claims, No Drawings

COMPOSITION FOR ELIMINATING EFFLORESCENCE IN PORTLAND CEMENT PRODUCTS

This invention relates to a composition for substantially lessening or eliminating efflorescence in Portland cement products. The composition prevents bleeding out of salts present in Portland cement which lead to efflorescence, and produces improved surface smoothness, enhancement of color in products made of cement to which our composition has been added, and resistance to moisture penetration. The depth of color added to the cement treated with this composition is greater than that of cement untreated with our composition to which the same percentage of coloring agent has been added.

The invention is especially valuable when the treated concrete is used for fabricating building structures and parts of building structures such as steps, balustrades, decorative walls and the like, and for decorative purposes involving the use of coloring pigments to impart color to the concrete.

Much effort has been directed in the past toward lessening or eliminating the efflorescence of concrete. Efflorescence is defined as the migration of sparingly soluble salts, normally present in all Portland cement, to the surface of the concrete during the cure and post cure periods. Calcium sulfate is the main offender and is the major cause of this effect. Calcium sulfate has limited solubility in water, namely, 0.241 g. in 100 ml. of water. Calcium hydroxide, which also is present to a smaller extent, will also bleed to the surface of curing concrete and will deposit on the surface of curing concrete where it forms calcium carbonate with the carbon dioxide in the air. Calcium solubility is 0.185 g. per 100 ml. of water.

The efflorescence appears as a white coating on the surface of concrete and imparts a mottled layer to the surface which is unattractive and detracts from the appearance of the structures made with this material. When colored concrete is used for decorative purposes, the efflorescence detracts from the appearance of the structure by its mottled and spotty surface coating.

The composition comprises polyvinyl alcohol having certain characteristics relating to viscosity, molecular weight and solubility in water, and barium hydroxide or barium oxide, prepared as herein described.

We have found that barium hydroxide or barium oxide reacts to form a type of compound known as a "chelate" when it comes into contact with polyvinyl alcohol. To prove this reaction, we determined the relative viscosities of polyvinyl alcohol and of barium hydroxide in water solutions, and the viscosity of a mixture of the polyvinyl alcohol and barium hydroxide in water solution. A 2.00 percent solution in water or polyvinyl alcohol ("Elvanol Polyvinyl Alcohol 50–42" manufactured by E. I. DuPont de Nemours & Co.) was determined to have the relative viscosity of 4.967; a 2.00 percent solution in water of barium hydroxide was determined to have the relative viscosity of 1.0665; and a water solution of 2.00 percent polyvinyl alcohol and 2.00 percent barium hydroxide was determined to have the viscosity of 6.898, which is greater than the sum of the viscosities of the two separate ingredients.

The composition of our invention is prepared by grinding Portland cement, either clinker or previously powdered, polyvinyl alcohol and barium hydroxide or barium oxide in a ball mill. Water and sand is added to the resultant mixture to make concrete. A typical formula used as the base for our composition is the following:

| | |
|---|---|
| Polyvinyl Alcohol | 1 g. |
| Barium Hydroxide | 0.2 g. |
| Portland Cement | 100 g. |
| Sand | 300 g. |
| Water | 44 cc. |

The polyvinyl alcohol in this formula is 1 percent of the Portland cement. Experiments were conducted in which the polyvinyl alcohol content was varied between ¼ and 5 percent; the desired effect began to appear at ¾ percent (0.75 g. of polyvinyl alcohol to 100 g. Portland cement).

In these experiments we used a light shade of Portland cement in the form of fine gray powder known as Type 1 or Grade A. Polyvinyl alcohols vary in molecular weight and viscosity and hence in solubility in water. Experiments showed that the best effect for out purposes is obtained by the use of very sparingly soluble and insoluble alcohols, having high viscosity and high molecular weight. "Elvanol 72–60" is an example of polyvinyl alcohol well suited for our purposes. This polyvinyl alcohol and others useful in producing our composition are 100 percent hydrolyzed. They are manufactured by a process involving polymerization of vinyl acetate and partial to complete hydrolysis of the intermediate polyvinyl acetate to polyvinyl alcohol. Solution viscosity increases with increasing degree of polymerization.

Thus the completely hydrolyzed, highly viscous and insoluble, or very slightly soluble, polyvinyl alcohols, together with the barium hydroxide, mixed as described with Portland cement, in the proportions stated, and added to sand and water to make concrete, result in a product characterized by absence of bleeding out of salts present in the Portland cement, freedom from efflorescence, easy "troweling" for smooth surfaces, enhanced color in the finished product when a coloring agent has been added, and high resistance to penetration of moisture when the product has cured and dried. The workability of the finished product is such that a much smoother concrete is produced which makes it desirable for decorative construction. Freedom from efflorescence is a valued quality in patios, buildings, walks, ornamental structures for gardens, and other products, particularly where colored surfaces are desired.

The barium hydroxide - polyvinyl alcohol complex compound combines with any calcium hydroxide formed during the curing of the concrete and also with that resulting from the reaction of barium hydroxide with calcium sulfate according to the following reaction

$$Ba(OH)_2 + CaSO_4 \rightarrow BaSO_4 + Ca(OH)_2$$

Calcium belongs to the same group of elements as barium and accordingly both hydroxides react with polyvinyl alcohol.

Our formulations may be used with polyvinyl alcohol - insolubilizing reagents to further increase resistance to migration of water. This may be desirable where the concrete is to be used for decorative paneling, decorative art work and the like. Many reagents may be used to enhance water resistance, such as dimethylol urea, trimethylol melamine, glyoxal, inorganic salts, organic titanates, polyvinyl-methyl-ether/maleic anhydride copolymer, the thio-organic acids (such as thioglycolic and thiopropionic acids) etc.

Adding the polyvinyl alcohol to the Portland cement clinker before pulverizing, i.e., during the grinding, in preparing the Portland cement for packaging, is the preferred method. The second choice is to ballmill the polyvinyl alcohol with the Portland cement as it is purchased in the powder form. This is necessary because of the low solubility of the grade of polyvinyl alcohol used in our process.

It should also be noted that when the concentration of polyvinyl alcohol approaches 1 percent based on Portland cement used, there occurs a pronounced enhancement of surface color of the cured cement. This is important economically when pigment is added to color the concrete.

We claim:

1. A composition for substantially lessening or eliminating efflorescence in Portland cement products consisting of polyvinyl alcohol characterized by high molecular weight and viscosity and very low solubility or insoluble in water, and barium hydroxide or barium oxide, mixed together, in which the polyvinyl alcohol is combined with the barium hydroxide or oxide in the proportion of approximately 1 g. of the alcohol to 0.2 g. of the barium compound.

2. The composition defined by claim 1, in which the ingredients are combined by grinding in a ball mill.

3. A composition for substantially lessening or eliminating efflorescence in Portland cement products consisting essentially of Portland cement and the composition of claim 1, mixed together, in which the polyvinyl alcohol is combined with the Portland cement in proportions within the range of approximately ½ to 5 percent of the alcohol to 100 percent of the cement.

4. The composition defined by claim 3, in which the polyvinyl alcohol is combined with the Portland cement in the proportion of approximately 1 percent of the alcohol to 100 percent of the cement.

5. The composition defined by claim 3, in which the polyvinyl alcohol and the barium hydroxide or oxide when mixed together have a higher relative viscosity than the sum of the relative viscosities of said separate components.

6. The composition defined by claim 3, in which the Portland cement is in clinker form and the ingredients are combined by grinding the cement clinker with the alcohol and barium to pulverize the mixture before packaging.

7. The composition defined by claim 3, in which the Portland cement is in powder form, and the ingredients are combined by milling together in a ball mill, preparatory to mixing with water to produce concrete.

* * * * *